(12) United States Patent
Medhat

(10) Patent No.: US 8,059,678 B1
(45) Date of Patent: Nov. 15, 2011

(54) COMMUNICATION SURGE RESPONSE SYSTEM

(75) Inventor: Khalid Mohamed Medhat, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 878 days.

(21) Appl. No.: 11/671,671

(22) Filed: Feb. 6, 2007

(51) Int. Cl.
*H04J 3/16* (2006.01)

(52) U.S. Cl. ........................................ 370/466

(58) Field of Classification Search ............... 370/522, 370/237, 230, 235, 312, 329, 252, 401, 466; 709/223, 235; 455/466
See application file for complete search history.

(56) References Cited

U.S. PATENT DOCUMENTS

| | | | | |
|---|---|---|---|---|
| 7,366,530 B2 * | 4/2008 | McCann et al. | | 455/466 |
| 7,558,199 B1 * | 7/2009 | Minei et al. | | 370/230 |
| 2001/0049730 A1 * | 12/2001 | Brendes et al. | | 709/223 |
| 2002/0034166 A1 * | 3/2002 | Barany et al. | | 370/329 |
| 2003/0120796 A1 * | 6/2003 | Shin | | 709/235 |
| 2004/0105402 A1 * | 6/2004 | Yi et al. | | 370/312 |
| 2006/0078008 A1 * | 4/2006 | Bordonaro et al. | | 370/522 |
| 2007/0047446 A1 * | 3/2007 | Dalal et al. | | 370/237 |
| 2007/0127381 A1 * | 6/2007 | Oh et al. | | 370/235 |

\* cited by examiner

*Primary Examiner* — Derrick Ferris
*Assistant Examiner* — Gbemileke Onamuti

(57) ABSTRACT

A session control system in a service network configured to receive from a border system first control traffic in a first control protocol transmitted from a device in an access network to control a session, comprising a first interface configured to receive an update message indicating status information related to the border system; a processing system coupled to the first interface and configured to generate second control traffic in response to the update message; and a second interface configured to transfer the second control traffic in a second control protocol to the device wherein the second control protocol is different than the first control protocol.

20 Claims, 8 Drawing Sheets

COMMUNICATION SURGE RESPONSE SYSTEM

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention relates to network communications, and in particular, to reducing network traffic to border systems in the event of network communication surges.

2. Description of the Prior Art

Service providers typically provide services over service networks to customer devices. Some examples of services are telephony, data services, on-demand video and other multimedia services. Oftentimes, access providers provide access for devices to service networks over access networks.

Border systems provide an interface between access networks and service networks. Border systems can comprise a plurality of border elements, each of which communicates in a control protocol with the devices. Additionally, border elements receive control traffic transmitted by devices, and send control traffic to a session control system (SCS). The SCS exchanges control traffic with the devices to control the session for the particular service that a device requires.

Border systems also send update messages to an SCS indicating the level of congestion on individual border elements. This enables the SCS to balance the load of control traffic for a border system amongst the border elements. Lacking this capacity, border elements could become congested, stop sending control traffic to the SCS, and service to the devices would suffer.

A border element could become congested through hardware or software failures. The processors in the border elements, or the communication lines into the border system could be overwhelmed by control traffic from devices. The software controlling the communication (control protocol) could also be overwhelmed and hinder the ability of the border system to send control traffic to an SCS, thereby degrading the quality of service provided.

Oftentimes however, load balancing is inadequate to prevent border element failures. In the event of communication surges, such as high-volume call events, popular pay-per-view events or multimedia webcasts, all the border elements in a border system could become congested. Without a border element to relieve control traffic on the congested border elements, the quality of services provided is degraded.

SUMMARY OF THE INVENTION

Embodiments of the invention help solve the above and other problems by utilizing an alternate control protocol through which session control systems send control messages instructing devices to withhold control traffic until adequate network resources can be made available. The alternate control protocol is different from the control protocol through which devices and a session control system exchange session control traffic.

In an embodiment of the invention, a session control system for controlling a session in a service network, configured to receive first control traffic in a first control protocol from a border system, the first control traffic being transmitted from a device in an access network comprises a first interface configured to receive an update message indicating status information related to the border system; a processing system coupled to the first interface and configured to generate second control traffic in response to the update message; and a second interface configured to transfer the second control traffic in a second control protocol to the device wherein the second control protocol is different than the first control protocol.

In an embodiment of the invention, a processing system is configured to process the update message to determine a status of the border system and generate the second control traffic based on the status of the border system.

In an embodiment of the invention, the device reduces the traffic transmitted to the border system in response to the second control traffic.

In an embodiment of the invention, the first control traffic comprises session initiation protocol (SIP) traffic.

In an embodiment of the invention, the second control traffic comprises a short message service (SMS) message.

In an embodiment of the invention, a method of operating a session control system for controlling a session in a service network configured to receive from a border system first control traffic in a first control protocol transmitted from a device in an access network, comprises receiving an update message indicating status information related to the border system; generating second control traffic in response to the update message; and transferring the second control traffic in a second control protocol to the device wherein the second control protocol is different than the first control protocol.

In an embodiment of the invention, a session control system for controlling a session in a service network, configured to receive from a border system first control traffic transmitted from a device in an access network, comprises a first interface configured to receive an update message indicating status information related to the border system; a processing system coupled to the first interface and configured to generate second control traffic in response to the update message; and a second interface configured to transfer the second control traffic to the device, wherein the device reduces the first control traffic transmitted to the border system in response to the second control traffic.

In an embodiment of the invention, a method of operating a session control system for controlling a session in a service network configured to receive from a border system first control traffic in a first control protocol transmitted from a device in an access network, comprises receiving an update message indicating status information related to the border system; generating second control traffic in response to the update message; and transferring the second control traffic to the device wherein the device reduces the first control traffic transmitted to the border system in response to the second control traffic.

BRIEF DESCRIPTION OF THE DRAWINGS

The same reference number represents the same element on all drawings.

The same reference number represents the same element on all drawings.

DETAILED DESCRIPTION OF THE PREFERRED EMBODIMENT

FIGS. 1-8 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

Figure 1:
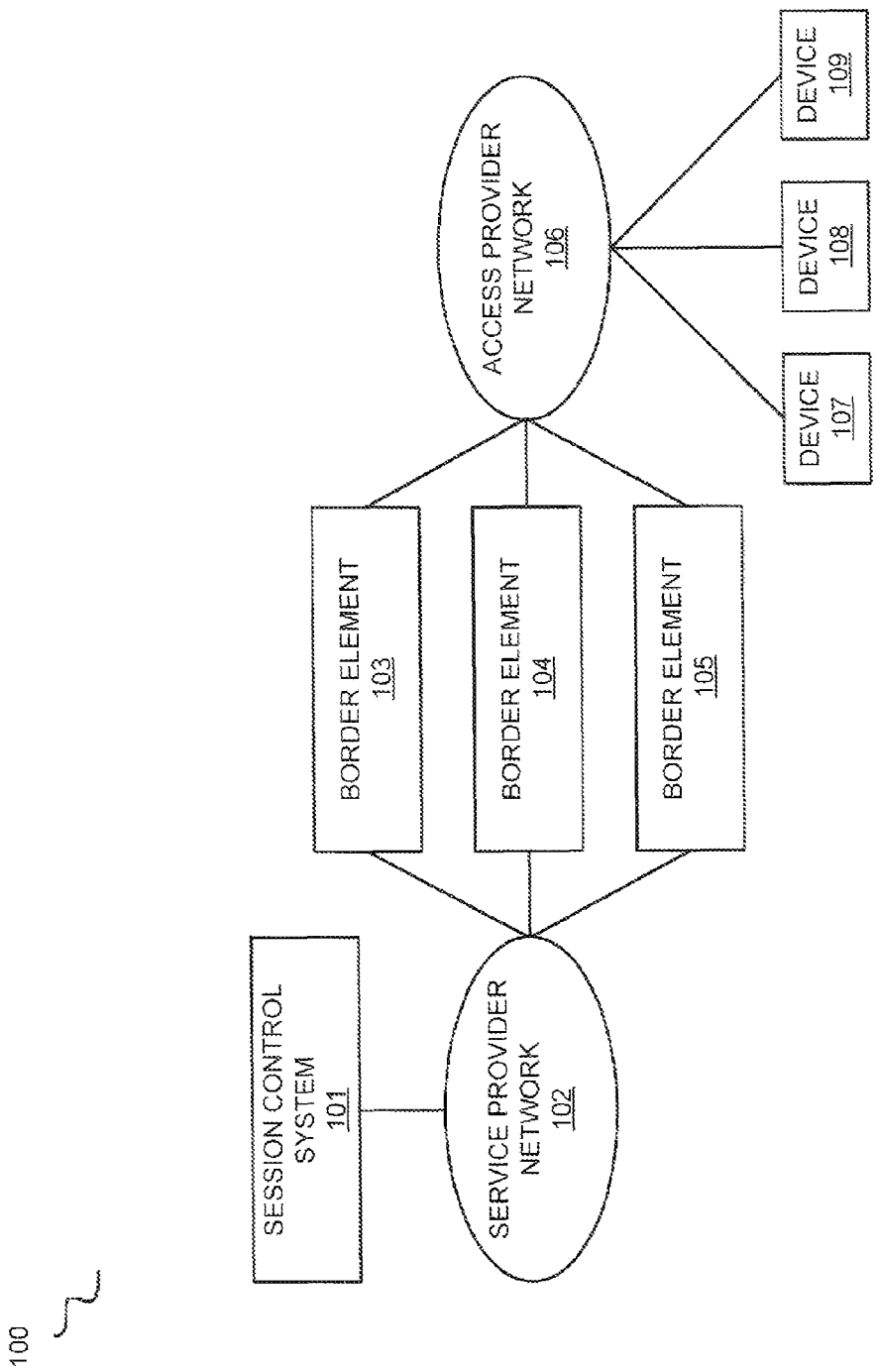
FIG. 1 illustrates a communication surge system in an embodiment of the invention.

FIG. 1 illustrates communication surge system 100 in an embodiment of the invention. Communication surge system 100 could include session control system (SCS) 101, service provider network 102, border elements 103, 104, and 105, access provider network 106, and devices 107, 108, and 109.

In an embodiment, SCS 101 could be operatively coupled to, connected to, or otherwise in communication with border elements 103, 104, and 105. It should be understood that multiple border elements are shown for exemplary purposes, but that more or fewer border elements could be employed.

SCS 101 could be any system or collection of systems capable of communicating with border elements 103, 104, and 105, or devices 107, 108 and 109 to control services provided to devices 107, 108 and 109. SCS 101 could be linked to border elements 103, 104, and 105 over service provider network 102. Service provider network 102 could be any network or collection of networks capable of linking SCS 101 with border elements 103, 104, and 105. SCS 101 could communicate with border elements 103, 104, and 105 using a well known control protocol, such as a border element control protocol.

SCS 101 could communicate with devices 107, 108, and 109 using a well known control protocol. In addition, SCS 101 could communicate with devices 107, 108, and 109 using an alternative control protocol. It should be understood that SCS 101 could communicate with devices 107, 108, and 109 over service provider network 102 and access provider network 106. However, other networks could be utilized to facilitate communication between SCS 101 and devices 107, 108, and 109.

Border elements 103, 104, and 105 could be any systems or collection of systems capable of interfacing control and bearer traffic for communications between devices 107, 108, and 109 and SCS 101 or any other destination for the traffic or communications. Border elements 103, 104, and 105 could provide signaling gateway functionality, as well as bearer traffic gateway functionality. Border elements 103, 104, and 105 could be capable of sending, transmitting, or otherwise providing SCS 101 with update messages indicating the performance health of border elements 103, 104, or 105. For example, the update messages could indicate whether or not a border element is in a state of congestion. Other performance information could include CPU occupancy, message load, or session loads, as well as other performance information.

Devices 107, 108, and 109 could be any devices, such as mobile phones, personal computers, or other such communication devices, capable of obtaining services provided over service provider network 102. Examples of services include voice calling and video on demand, as well as other types of audio and video services. Devices 107, 108 and 109 could be coupled to, connected to, or otherwise in communication with border elements 103, 104, and 105 over access provider network 106. Access provider network 106 could be any network or collection of networks capable of providing devices 107, 108, and 109 with access to service provider network 102, and the services provided by service provider network 102, through border elements 103, 104, and 105.

Devices 107, 108, and 109 could be capable of communicating with border elements 103, 104, and 105 utilizing well known protocols to transfer control and bearer traffic to and from border elements 103, 104, and 105. Similarly, devices 107, 108, and 109 could be capable of communicating with SCS 101 using a well known control protocol to exchange control communications or traffic for controlling the services. Devices 107, 108, and 109 could also be capable of exchanging or otherwise communicating signaling or control traffic with SCS 101 utilizing another alternative control protocol. In addition, devices 107, 108, and 109 could be capable of communicating with SCS 101 over access network 106 and service provider network 102, as well as over an alternative communication network.

In an operational example, a user operating device 107 may desire to obtain a service provided by service provider network 102. In order to obtain the service, device 107 exchanges control traffic with border element 105 and SCS 101 to establish a session for the service. The control traffic exchanged with SCS 101 could be in a first control protocol.

At anytime before or during the service session, SCS 101 could receive update messages indicating status information related to border elements 103, 104, and 105. During normal control traffic conditions, border element 105 provides signaling and bearer traffic gateway functionality, whereby service provider network provides the service described above to device 107.

However during a communication surge, such as a mass call event on Mother's Day, border elements 103, 104, and 105 become congested and SCS 101 stops receiving control traffic from border elements 103, 104, and 105. Unable to receive control traffic, SCS 101 can no longer control the session for the service provided to device 107. After receiving an update message indicating the congested status of border elements 103, 104 and 105, SCS 101 generates control traffic to instruct devices 107, 108, and 109 to reduce or stop transmitting control traffic to border elements 103, 104, and 105.

It should be understood that the control traffic transmitted from devices 107, 108, and 109 to border elements 103, 104, and 105 could be in a different protocol than the control traffic sent from SCS 101 to devices 107, 108, and 109 in response to the update message. Advantageously, by reducing the traffic burden on the border elements, the border elements can return to an un-congested state. In addition, by using a different protocol than the original control traffic to instruct the devices to reduce traffic, further congestion is avoided.

Figure 2:
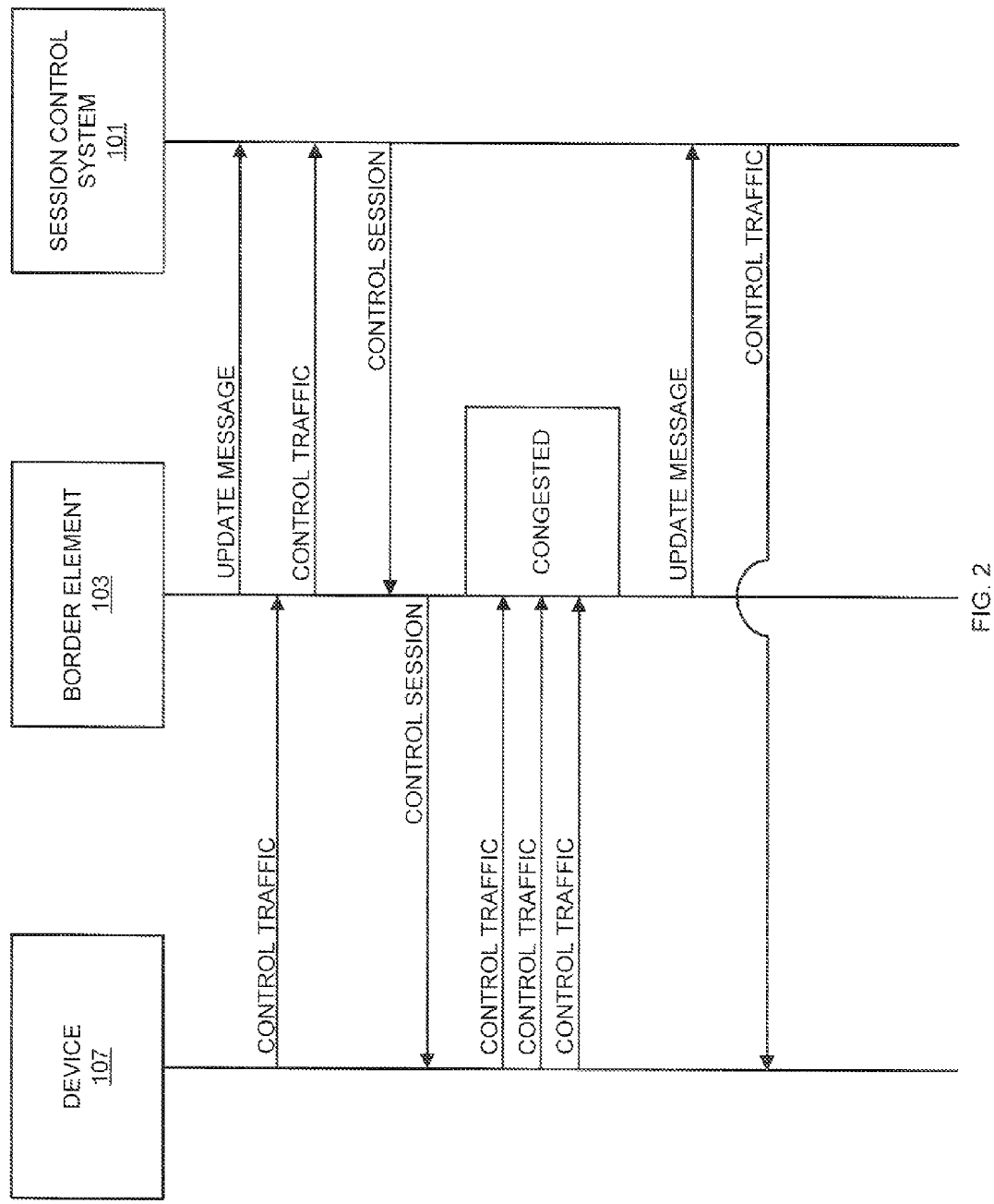
FIG. 2 illustrates the operation of a communication surge system in an embodiment of the invention.

FIG. 2 illustrates communication surge system 100 operation in an embodiment of the invention. SCS 101 is configured to receive update messages from border element 103. The update messages contain status information that indicate the level of congestion on border element 103. The status information could include central processing unit (CPU) occupancy, signaling message load (possibly by signal type), bearer path load, and memory occupancy. In this embodiment, SCS 101 processes the update message and determines the status of border element 103 is not congested. Normal operation continues.

A device 107 could require a service provided over service provider network 102, such as VOIP or a multimedia service. Device 107 could transmit first control traffic in a first control protocol to border element 103. The first control traffic could be any control traffic capable of controlling a session for providing a service to device 107. For example, device 107 could transmit first control traffic indicating a request from device 107 to register with SCS 101. Border element 103 could receive the first control traffic from device 107, determine that the first control traffic is not a virus or Denial of Service attack, and send the first control traffic to SCS 101. SCS 101 could receive the first control traffic, process it to control device 107's session. Controlling device 107's session in this embodiment could comprise sending a first control traffic in a first control protocol to acknowledge device 107's registration request. Border element 103 could receive the first control traffic from SCS 101 and send it to device 107.

During a communication surge, border element 103 could become congested. Device 107 could transmit first control traffic in a first control protocol to border element 103 to initiate a session, whereby device 107 could utilize VOIP service to communicate with another device. Because border element 103 is congested, it may not receive first control traffic from device 107, or border element 103 may not be able to process the first control traffic. Thereby, SCS 101 does not receive the first control traffic, and is unable to initiate a VOIP session for device 107. Device 107 could continue to transmit first control traffic to initiate a session, further congesting border element 103.

SCS 101 could receive an update message, and process the message to determine that border element 103 is congested. SCS 101 could then generate second control traffic in a second protocol to instruct device 107 to withhold further first control traffic transmissions until border element 103 is no longer congested. Those skilled in the art appreciate that any number of devices could be sending first control traffic to border elements, and that the second control traffic could be sent to any number of those devices to reduce traffic on a congested border element.

In an advantage, the second control traffic reduces the traffic burden on the border elements so the border elements can return to an un-congested state. Further, by using a different protocol than the original control traffic to instruct the devices to reduce traffic, further congestion is avoided.

Figure 3:
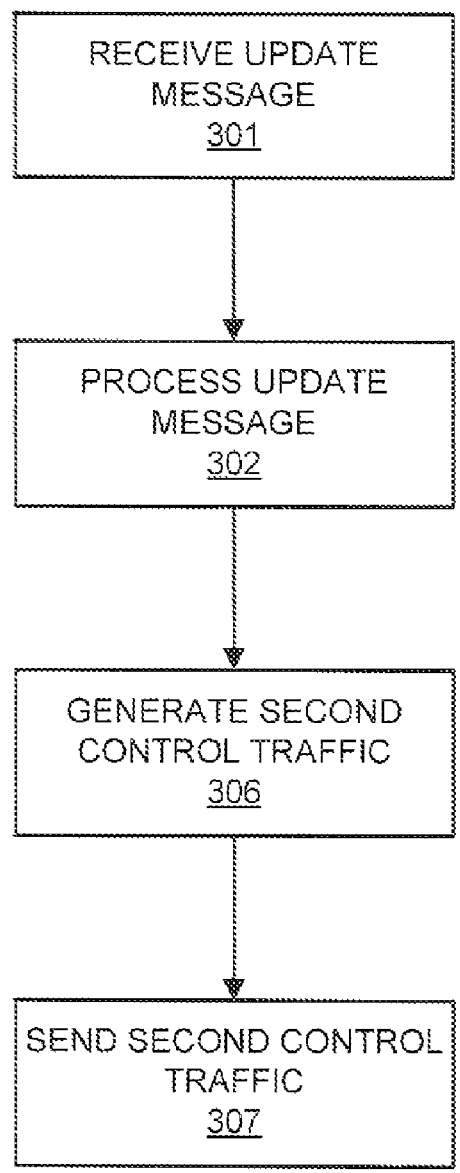
FIG. 3 illustrates the operation of a session control system in an embodiment of the invention.

FIG. 3 illustrates SCS 101 operation in an embodiment of the invention. SCS 101 receives an update message indicating status information related to the border system. The status information could indicate CPU occupancy, signaling message load (by type, possibly), bearer path load, and memory occupancy of the border system. (Step 301). SCS 101 processes the update message to determine the status of the border system (Step 302) and generates second control traffic based on the status of the border system. (Step 303). The second control traffic could be any control traffic capable of being transferred to devices 107, 108, and 109 in a different protocol than the control traffic transmitted from devices 107, 108, and 109 to SCS 101. For example, if SCS 101 determines that the status of the border system is congested, the second control traffic could comprise instructions for devices attempting to communicate with the border system to withhold traffic until the border system is no longer congested. SCS 101 could then send the second control traffic to the devices in a second control protocol. (Step 304). It should be understood that SCS 101 operation could be implemented using one or more applications on one or more processors.

In an advantage, the SCS rather than the border system sends second control traffic to reduce the traffic burden on the border system. This alleviates the need for the border elements to become further congested by attempting to communicate with the congested devices directly. By using a different protocol than the original control traffic to instruct the devices to reduce traffic, further congestion is avoided.

Figure 4:
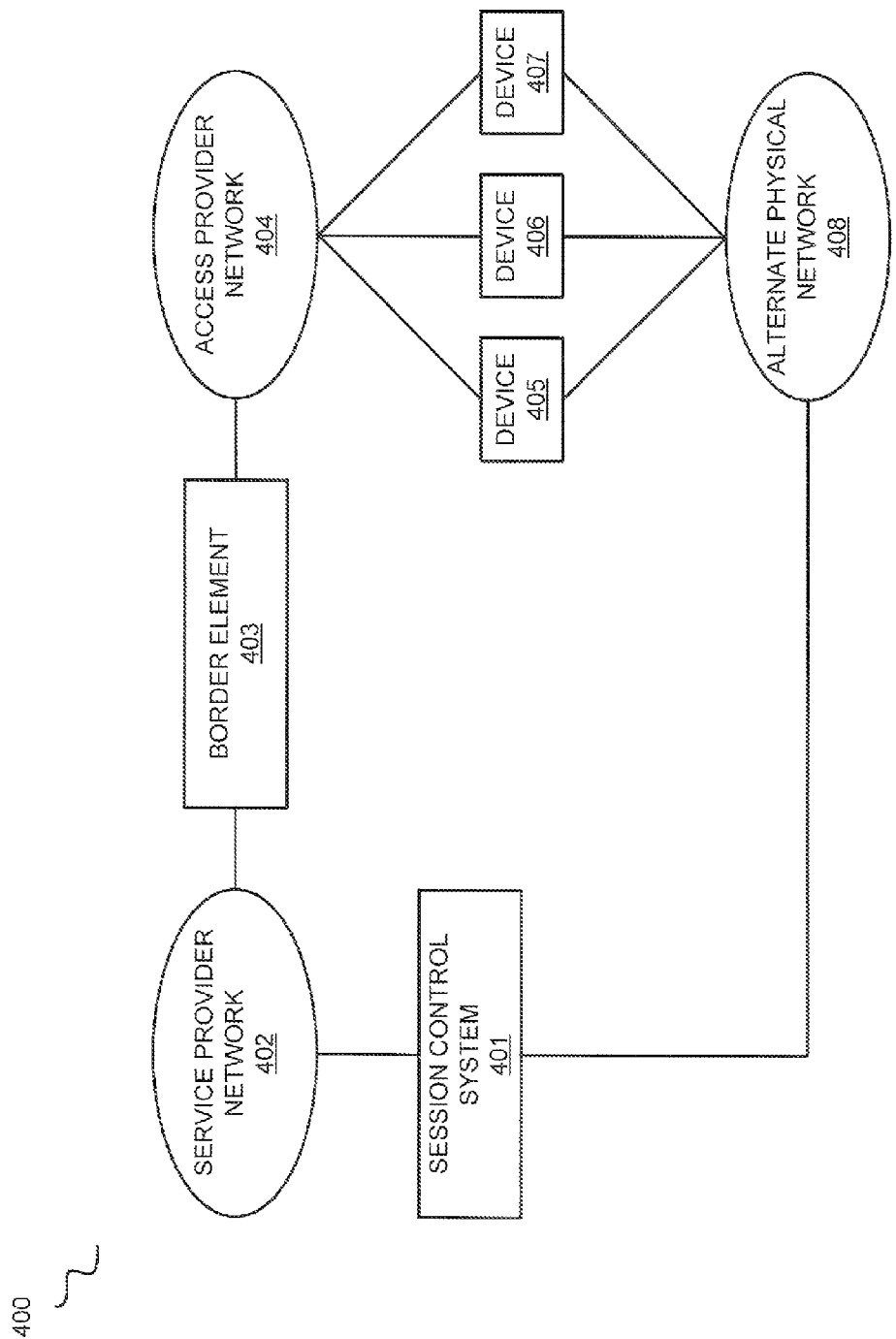
FIG. 4 illustrates a communication surge system in an embodiment of the invention.

FIG. 4 illustrates communication surge system 400 in an embodiment of the invention. Communication surge system 100 could include session control system (SCS) 401, service provider network 402, border element 403, access provider network 404, devices 405, 406, and 407, and alternate physical network 408.

In an embodiment, SCS 401 could be operatively coupled to, connected to, or otherwise in communication with border element 403. It should be understood that one border element is shown for exemplary purposes, but that more border elements could be employed.

SCS 401 could be any system or collection of systems capable of communicating with border element 403, and devices 405, 406, and 407 to control services provided to devices 405, 406, and 407. SCS 401 could be linked to border element 403 over service provider network 402. Service provider network 402 could be any network or collection of networks capable of linking SCS 401 with border element 403. SCS 401 could communicate with border element 403 using a well known control protocol, such as a border element control protocol.

It should be understood that SCS 401 could communicate with devices 405, 406, and 407 over service provider network 402 and access provider network 404 utilizing a well-known control protocol. However, alternate physical network 408 could be utilized to facilitate communication between SCS 401 and devices 405, 406, and 407 utilizing an alternative control protocol. SCS 401 could be linked, connected, or otherwise in communication with alternate physical network 408. Alternate physical network 408 could be any network or collection of networks capable of communicating control traffic to devices 405, 406, and 407.

Border element 403 could be any system or collection of systems capable of interfacing control and bearer traffic for communications between devices 405, 406, and 407 and SCS 401 or any other destination for the traffic or communications. Border element 403 could provide signaling gateway functionality, as well as bearer traffic gateway functionality. Border element 403 could be capable of sending, transmitting, or otherwise providing SCS 401 with update messages indicating the performance health of border elements 403. For example, the update messages could indicate whether or not a border element is in a state of congestion. Other performance information could include CPU occupancy, message load, or session loads, as well as other performance information.

Devices 405, 406, and 407 could be any devices, such as mobile phones, personal computers, or other such communication devices, capable of obtaining services provided over service provider network 402. Examples of services include voice calling and video on demand, as well as other types of audio and video services. Devices 405, 406, and 407 could be coupled to, connected to, or otherwise in communication with border element 403 over access provider network 404. Access provider network 404 could be any network or collection of networks capable of providing devices 405, 406, and 407 with access to service provider network 402, and the services provided by service provider network 402, through border element 403.

Devices 405, 406, and 407 could be capable of communicating with border element 403 utilizing a well-known control protocol to transfer control and bearer traffic to and from border element 403. Similarly, devices 405, 406, and 407 could be capable of communicating with SCS 401 using a well-known control protocol to exchange control communications or traffic for controlling the services. Devices 405, 406, and 407 could also be capable of exchanging or otherwise communicating signaling or control traffic with SCS 401 utilizing an alternative control protocol. In addition, devices 405, 406, and 407 could be capable of communicating with SCS 401 over access network 404 and service provider network 402, as well as over alternate physical network 408.

Figure 5:
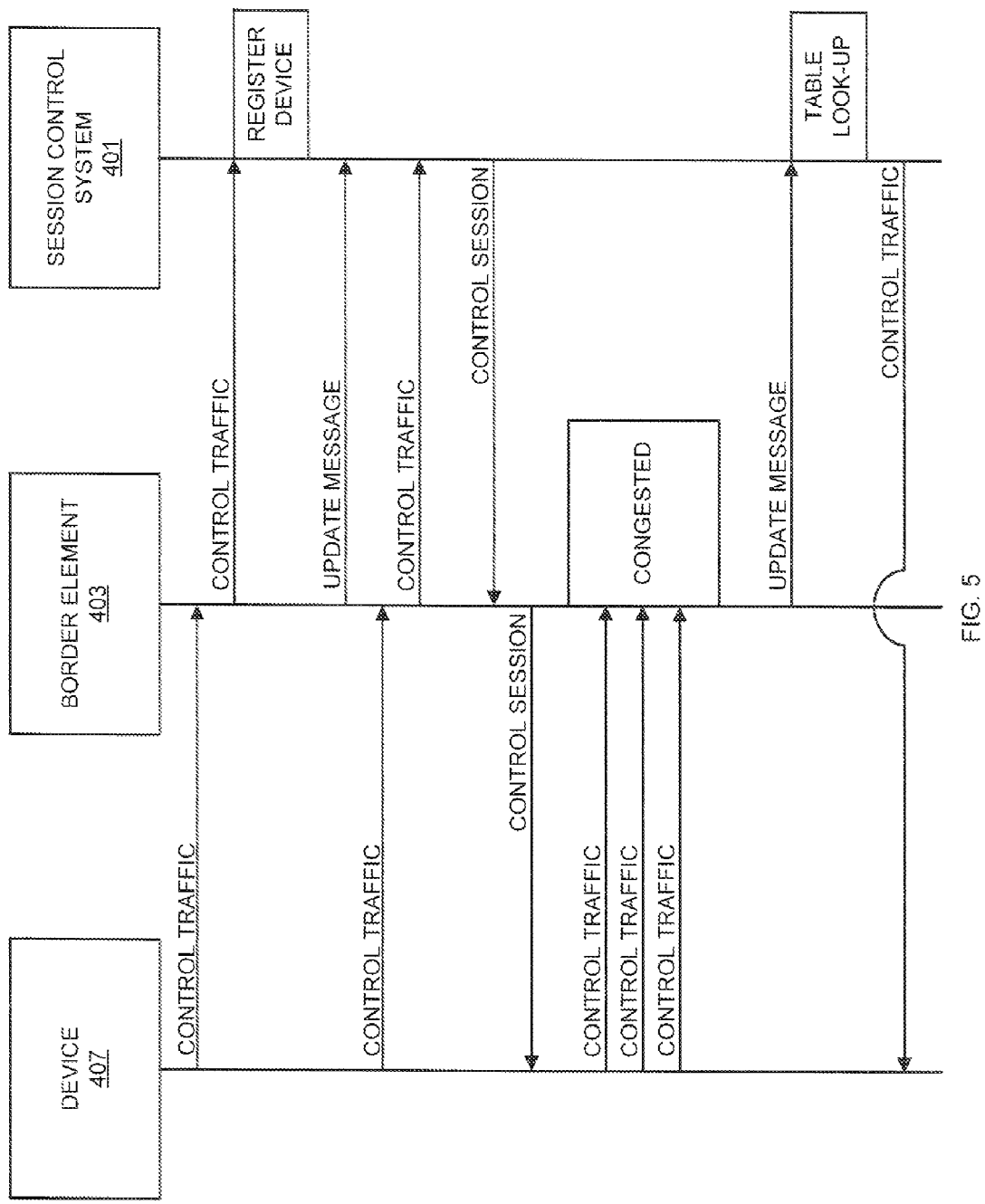
FIG. 5 illustrates the operation of a communication surge system in an embodiment of the invention.

FIG. 5 illustrates operation of communication surge system 400 in an embodiment of the invention. A user operating device 407 may desire to obtain a service provided by service provider network 402. In order to obtain the service, device 407 exchanges control traffic over access network 404 with border element 403 and SCS 401 to establish a session for the service. Typically, when device 407 powers on, it exchanges control traffic with SCS 401 such that device 407 is registered with service provider network 402. A registration could include potential contact methods for device 407, for example, available control protocols for communication with the device. Registration information could be stored in the SCS, or within service provider network 402.

At anytime before or during the service session, border element 403 SCS 401 could receive update messages indicating status information related to border element 403. During normal control traffic conditions, border element 403 provides signaling and bearer traffic gateway functionality, whereby service provider network provides the service described above to device 407.

However during a communication surge, such as a mass call event on Mother's Day, border element 403 becomes congested and SCS 401 stops receiving control traffic. Unable to receive control traffic, SCS 401 can no longer control the service provided to device 407. After receiving an update message indicating the congested status of border element 403, SCS 401 could perform a table look-up whereby it identifies all devices currently registered with service provider network 402, and an alternative control protocol for communicating with each device. SCS 401 could then generate control traffic to instruct devices 405, 406, and 407 to reduce or stop transmitting control traffic to border element 403.

It should be understood that the control traffic transmitted from devices 405, 406, and 407 could be in a different control protocol than the control traffic sent from SCS 401 to devices 405, 406, and 407 in response to the update message. Advantageously, by reducing the traffic burden on the border element, the border element can return to an un-congested state. In addition, by using a different protocol and an alternate physical network than the original control traffic to instruct the devices to reduce traffic, further congestion is avoided.

Figure 6:
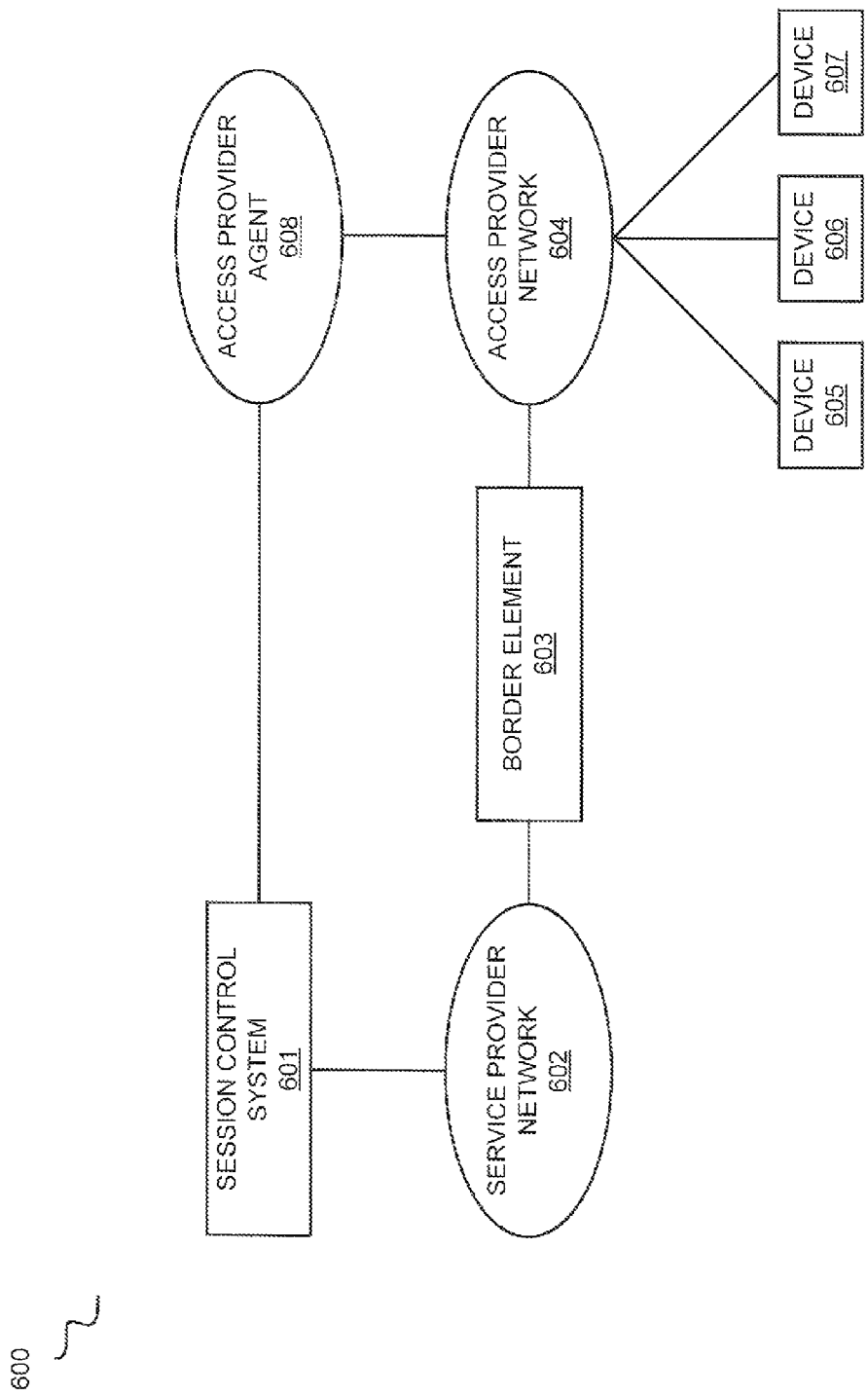
FIG. 6 illustrates a communication surge system in an embodiment of the invention.

FIG. 6 illustrates communication surge system 600 in an embodiment of the invention. Communication surge system 600 could include session control system (SCS) 601, service provider network 602, border element 603, access provider network 604, devices 605, 606, and 607, and access provider agent 608.

In an embodiment, SCS 601 could be operatively coupled to, connected to, or otherwise in communication with border element 603. It should be understood that one border element is shown for exemplary purposes, but that more border elements could be employed.

SCS 601 could be any system or collection of systems capable of communicating with border element 603, devices 605, 606, and 607 to control services provided to devices 605, 606, and 607, and access provider agent 608 to control sessions for services provided to devices 605, 606, and 607 over service provider network 602. SCS 601 could be linked to border element 603 over service provider network 602. Service provider network 602 could be any network or collection of networks capable of linking SCS 601 with border element 603. SCS 601 could communicate with border element 603, and devices 605, 606, and 607 using a well known control protocol, such as session initiation protocol (SIP), media gateway control protocol (MGCP), or H.323.

SCS 601 could be linked, connected, or otherwise in communication with access provider agent 608. Access provider agent 608 could be any system or collection of systems capable of communication with SCS 601 and devices 605, 606, and 607. SCS 601 could communicate with access provider agent 608 using an alternative control protocol, such as short messaging service (SMS) or extended messaging service (EMS). Access provider agent 608 could be linked, connected, or otherwise in communication with devices 605, 606, and 607. It should be understood that access provider agent 608 could communicate with devices 605, 606, and 607 over access provider network 604 utilizing a control protocol such as SIP, MGCP, or H.323.

Border element 603 could be any system or collection of systems capable of interfacing control and bearer traffic for communications between devices 605, 606, and 607 and SCS 601 or any other destination for the traffic or communications. Border element 603 could provide signaling gateway functionality, as well as bearer traffic gateway functionality. Border element 603 could be capable of sending, transmitting, or otherwise providing SCS 601 with update messages indicating the performance health of border elements 603. For example, the update messages could indicate whether or not a border element is in a state of congestion. Other performance information could include CPU occupancy, message load, or session loads, as well as other performance information.

Devices 605, 606, and 607 could be any devices, such as mobile phones, personal computers, or other such communication devices, capable of obtaining services provided over service provider network 602. Examples of services include voice calling and video on demand, as well as other types of audio and video services. Devices 605, 606, and 607 could be coupled to, connected to, or otherwise in communication with border element 603 over access provider network 604. Access provider network 604 could be any network or collection of networks capable of providing devices 605, 606, and 607 with access to service provider network 602, and the services provided by service provider network 602, through border element 603.

Devices 605, 606, and 607 could be capable of communicating with border element 603 utilizing a control protocol such as SIP, MGCP, or H.323 to transfer control and bearer traffic to and from border element 603. Similarly, devices 605, 606, and 607 could be capable of communicating with SCS 601 using a control protocol such as SIP, MGCP, or H.323 to exchange control communications or traffic for controlling the services. Devices 605, 606, and 607 could also be capable of exchanging or otherwise communicating signaling or control traffic with access provider agent 608 using a control protocol such as SIP, MGCP, or H.323. In addition, devices 605, 606, and 607 could be capable of communicating with SCS 601 over access network 604 and service provider network 602.

Figure 7:
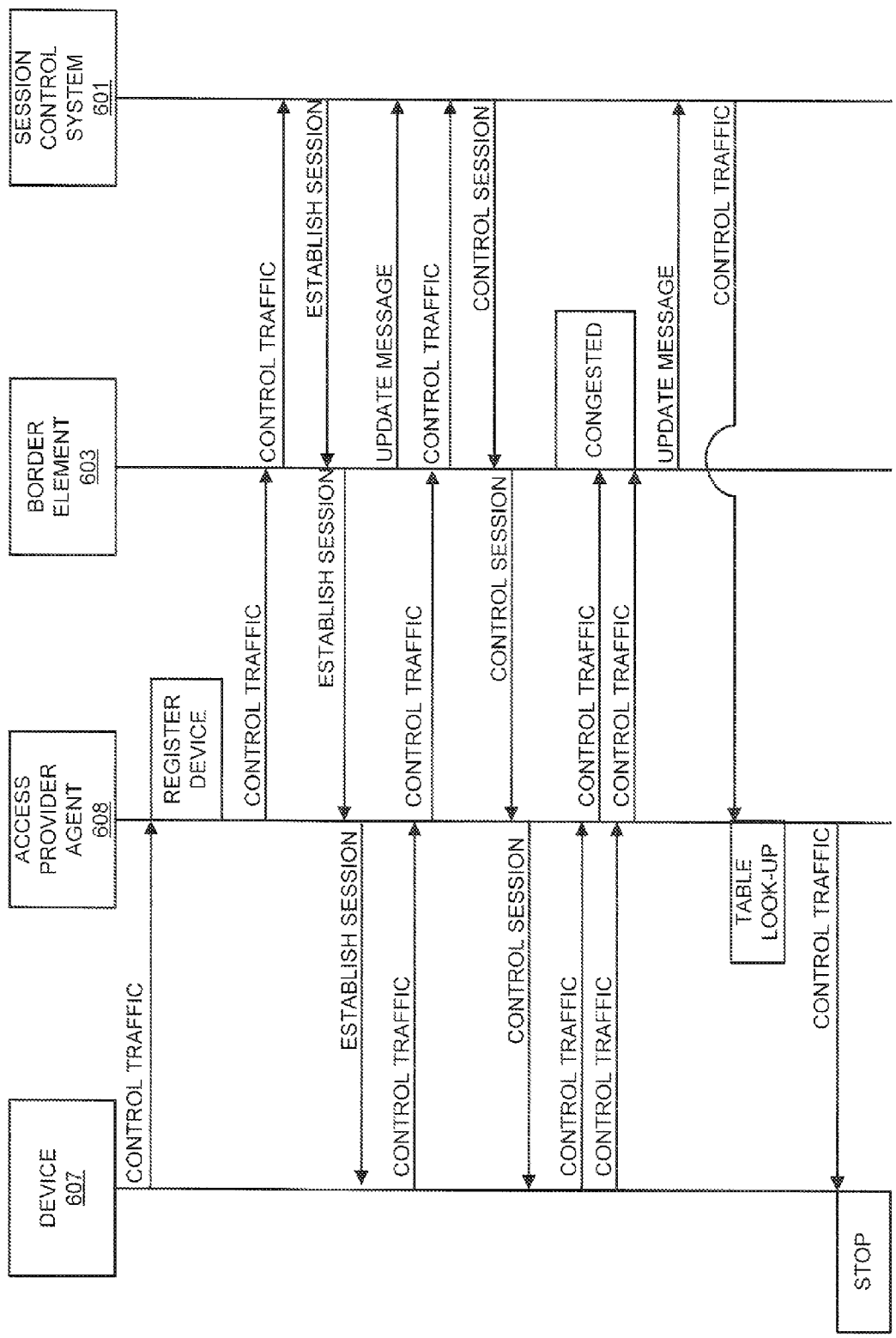
FIG. 7 illustrates the operation of a communication surge system in an embodiment of the invention.

FIG. 7 illustrates operation of communication surge system 600 in an embodiment of the invention. A user operating device 607 may desire to obtain a service provided by service provider network 602. In order to obtain the service, device 607 exchanges control traffic with access provider agent 608. In turn, access provider agent 608 registers device 607 and exchanges control traffic with border element 603 and SCS 601 to establish a session for the service. The control traffic exchanged with SCS 601 could be in one of a number of control protocols, including but not limited to SIP, H.323, or media gateway control protocol (MGCP). At anytime before or during the service session, SCS 601 could receive update messages indicating status information related to border element 603.

During normal control traffic conditions, border element 603 provides signaling and bearer traffic gateway functionality, whereby service provider network provides the service described above to device 607. However during a communication surge, such as a mass call event on Mother's Day, border element 603 becomes congested and SCS 601 stops receiving control traffic. Unable to receive control traffic, SCS 601 can no longer control the service provided to device 607.

After receiving an update message indicating the congested status of border element 603, SCS 601 could generate control traffic to instruct access provider agent 608 to instruct all devices registered with access provider agent 608 to reduce or stop transmitting control traffic to border element 603. SCS 601 could send this control traffic in response to the update message in a different protocol than the control traffic transmitted from device 607 to access provider agent 608, and from access provider agent 608 to border element 603, including but not limited to SMS or EMS.

Access provider agent 608 could perform a look-up to determine which devices on access provider network 604 are in communication with service provider network 602. Access provider agent could generate and send control traffic instructing those devices to reduce or stop communication with service provider network 602 until services can be provided. Additionally, access provider agent 608 could cease send control traffic to border element 603 in response to control traffic transmitted from any devices on access provider network 604.

Advantageously, by reducing the traffic burden on the border element, the border element can return to an un-congested state. In addition, by communicating the instructions to reduce traffic via an access provider agent, further congestion is avoided.

Figure 8:
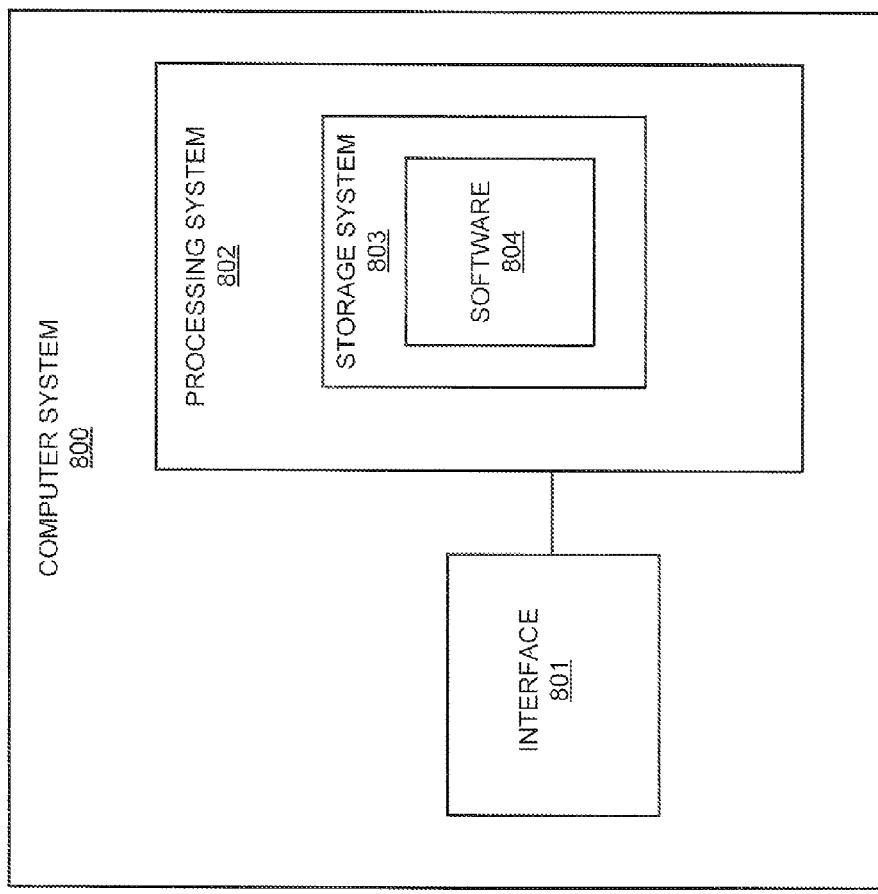
FIG. 8 illustrates an embodiment of the invention.

FIG. 8 illustrates computer system 800 in an embodiment of the invention. Computer system 800 includes interface 801, processing system 802, storage system 803, and software 804. Storage system 803 stores software 804. Processing system 802 is linked to interface 801. Computer system 800 could be comprised of a programmed general-purpose computer, although those skilled in the art will appreciate that programmable or special purpose circuitry and equipment may be used. Computer system 800 may use a client server architecture where operations are distributed among a server system and client devices that together comprise elements 801-804.

Interface 801 could comprise a network interface card, modem, port, or some other communication device. Interface 801 may be distributed among multiple communication devices. Processing system 802 could comprise a computer microprocessor, logic circuit, or some other processing device. Processing system 802 may be distributed among multiple processing devices. Storage system 803 could comprise a disk, tape, integrated circuit, server, or some other memory device. Storage system 803 may be distributed among multiple memory devices.

Processing system 802 retrieves and executes software 804 from storage system 803. Software 804 may comprise an operating system, utilities, drivers, networking software, and other software typically loaded onto a general-purpose computer. Software 804 could also comprise an application program, firmware, or some other form of machine-readable processing instructions. When executed by the processing system 802, software 804 directs processing system 802 to operate as described above for the elements of communication surge system 100, communication surge system 400, or communication surge system 600.

Those skilled in the art will appreciate variations from these embodiments that fall within the scope of the invention. Those skilled in the art will appreciate that the features described above could be combined in various ways to form multiple embodiments of the invention. As a result, the invention is not limited to the specific embodiments described above, but only by the claims and their equivalents.

The invention claimed is:

1. A session control system in a service network comprising:
a first interface configured to receive from a border system first control traffic in a first control protocol transmitted from a device in an access network to control a session;
the first interface further configured to receive an update message indicating status information related to the border system;
a processing system coupled to the first interface and configured to process the update message to determine a status of the border system, wherein the status includes signaling message load and bearer path load of the border system, and generate second control traffic comprising a short message service (SMS) message based on the status of the border system in response to the update message; and
a second interface configured to transfer the second control traffic in a second control protocol to the device on a path that does not pass through the border system, wherein the second control protocol is different than the first control protocol.

2. The session control system of claim 1 wherein the status further includes central processing unit occupancy and memory occupancy of the border system.

3. The session control system of claim 1 wherein the device reduces the first control traffic transmitted to the border system in response to the second control traffic.

4. The session control system of claim 1 wherein the first control traffic comprises session initiation protocol (SIP) traffic.

5. A method of operating a session control system in a service network, the method comprising: in a first interface of the session control system, receiving from a border system first control traffic in a first control protocol transmitted from a device in an access network to control a session;

in the first interface, receiving an update message indicating status information related to the border system;
in a processing system of the session control system, processing the update message to determine a status of the border system, wherein the status includes signaling message load and bearer path load of the border system, and generating second control traffic comprising a short message service (SMS) message based on the status of the border system in response to the update message; and
in a second interface of the session control system, transferring the second control traffic in a second control protocol to the device on a path that does not pass through the border system wherein the second control protocol is different than the first control protocol.

6. The method of claim 5 wherein the status further includes central processing unit occupancy and memory occupancy of the border system.

7. The method of claim 5 wherein the device reduces the first control traffic transmitted to the border system in response to the second control traffic.

8. The method of claim 5 wherein the first control traffic comprises session initiation protocol (SIP) traffic.

9. A session control system for controlling a session in a service network, the session control system comprising:
a first interface configured to receive from a border system first control traffic transmitted from a device in an access network;
the first interface further configured to receive an update message indicating status information related to the border system;
a processing system coupled to the first interface and configured to process the update message to determine a status of the border system, wherein the status includes central processing unit capacity and signaling message load of the border system, and generate second control traffic comprising a short message service (SMS) message based on the status of the border system in response to the update message; and
a second interface configured to transfer the second control traffic to the device on a path that does not pass through the border system, wherein the device reduces the first control traffic transmitted to the border system in response to the second control traffic.

10. The session control system of claim 9 wherein the status further includes bearer path load and memory occupancy of the border system.

11. The session control system of claim 9 wherein the first control traffic is transmitted in a first control protocol.

12. The session control system of claim 11 wherein the second control traffic is transmitted in a second control protocol.

13. The session control system of claim 12 wherein the second control protocol is different than the first control protocol.

14. The session control system of claim 12 wherein the first control traffic comprises session initiation protocol (SIP) traffic.

15. A method of operating a session control system for controlling a session in a service network, the method comprising:
in a first interface of the session control system, receiving from a border system first control traffic in a first control protocol transmitted from a device in an access network to control a session;
in the first interface, receiving an update message indicating status information related to the border system;
in a processing system of the session control system, processing the update message to determine a status of the border system, wherein the status includes central processing unit capacity and signaling message load of the border system, and generating second control traffic comprising a short message service (SMS) message based on the status of the border system in response to the update message; and
in a second interface of the session control system, transferring the second control traffic to the device on a path that does not pass through the border system, wherein the device reduces the first control traffic transmitted to the border system in response to the second control traffic.

16. The method of claim 15 wherein the status further includes bearer path load and memory occupancy of the border system.

17. The method of claim 15 wherein the first control traffic is transmitted in a first control protocol.

18. The method of claim 17 wherein the second control traffic is transmitted in a second control protocol.

19. The method of claim 18 wherein the second control protocol is different than the first control protocol.

20. The method of claim 19 wherein the first control traffic comprises session initiation protocol (SIP) traffic.

* * * * *